2,977,221

NICKEL-COBALT SEPARATION

Harold L. Howling, Arlington, and Edward S. Shanley, Winchester, Mass., assignors to Arthur D. Little, Inc., Cambridge, Mass., a corporation of Massachusetts No Drawing. Filed Nov. 17, 1958, Ser. No. 774,087

11 Claims. (Cl. 75—108)

This invention relates to a novel process for separating nickel and cobalt.

Nickel and cobalt usually occur together in ores and it has always been a difficult and expensive process to separate them, particularly to produce pure nickel which is required in large quantities in plating and many other industrial processes.

At present nickel and cobalt are commonly separated by a method using a hypochlorite. This method comprises the introduction of the hypochlorite into a nickel-cobalt solution. The hypochlorite reagent is made by adding chlorine gas to a solution containing carbonate and sodium hydroxide. The reagent is then added to a neutral ore solution until most of the cobalt has precipitated. Reagent addition is stopped when the solution begins to change color due to the precipitation of nickel hydroxide. The cobalt precipitate is rather complex but is known to undergo rapid oxidation and reduction in the presence of hypochlorite so that there is a continuous oxygen evolution and production of hydrochloric acid in a side reaction. This process has several inherent disadvantages, among which may be listed the fact that the sodium hypochlorite solution is difficult to make to a predetermined strength and is not stable. This in turn complicates the calculation of the exact amount of reagent to use. Moreover, the side reactions described tend to redissolve some of the cobalt and makes it necessary to use excess hypochlorite. Finally, the hydrolysis reaction tends to complicate pH control and therefore the efficiency of the separation. Another commercial process involves the direct reduction of nickel and cobalt ions with hydrogen gas. This process requires the use of high pressures and expensive equipment.

It would therefore be desirable to have a process for separating nickel and cobalt which would result in giving essentially pure nickel and pure cobalt derivatives, and which would furthermore not possess the disadvantages associated with the present processes.

We have found that nickel and cobalt can be simply and effectively separated by the use of a peroxy acid accompanied by the proper pH control. Our system provides a simple, rapid, hydrometallurgical process which may be carried out at ambient temperatures and pressures rather than an elevated temperature and pressures. Moreover, in the practice of this invention, no deleterious chemical species are introduced as in the case with hypochlorites. The equipment is simple and the resulting products are a nickel solution substantially free of cobalt and a cobalt precipitate with very small cross-contamination with nickel. The process is easily controlled and adjusted by merely changing the amount of reagent used and controlling the pH of the system. The resulting cobalt precipitate is easily returned to solution by treatment with a dilute acid.

It is therefore an object of this invention to provide a simple and reliable chemical process for separating nickel and cobalt. It is a further object to provide such a process which may be operated at ambient temperatures and pressures, and which is easily controlled. It is a further object to provide a process for nickel-cobalt separation which is safe and free from toxic by-products.

In general our process consists of forming a solution of nickel and cobalt sulfate, treating the solution with a peroxy acid and adjusting the pH so that it ranges between about 3 and 7. The reaction which takes places in this operation is not completely understood, but it is believed that it is due to the powerful selective oxidizing action of the peroxy acids on the cobalt in solution, which oxidizes the cobalt to a higher valence state with the consequent formation of such compounds as insoluble oxides and basic oxysalts which are thrown out of solution. The action is enhanced by controlling the pH. If pure cobalt is desired, then it is perferable to reduce the pH to the lower end of the specified pH range, thus preventing any precipitation of nickel. However, if the pH falls below about 3, cobalt compounds will not precipitate. If, on the other hand, it is desired to produce pure nickel, then the higher pH range will be used and some of the nickel will be precipitated with the cobalt, leaving an essentially pure nickel sulfate solution.

Only a small amount of work has been done with the peroxy acids and the literature contains very little information on their properties and behavior. It was therefore a novel and unexpected result when we found that by suitably controlling the reaction conditions the peroxy acids would selectively oxidize cobalt ions while leaving the nickel ions unreacted, thus affording a means of separating nickel and cobalt in a simple but most effective manner. Furthermore, we have found that only the peroxy mono acids react to precipitate any substantial quantity of cobalt. Inorganic salts of the peroxy mono acids may also be used in the practice of this invention.

Precipitation of the cobalt is conveniently carried out from a solution of cobalt and nickel sulfate. The cobalt precipitate is a dark gray to black material and may be separated by filtration, the filtrate containing all or substantially all of the nickel and little, if any, cobalt.

The method of separating nickel from cobalt in accordance with this invention may then be described as one characterized by the steps of adding to a solution of the sulfates of nickel and cobalt a precipitating agent selected from the group consisting of peroxy mono acids and salts thereof, and adjusting the pH to range from about 3 to about neutral.

The term peroxy mono acid as used hereinafter may be defined as those acids which can be considered to be derived from hydrogen peroxide by substituting an acid radical for one of the hydrogen atoms. These peroxy mono acids possess a —O—O— linkage, which is, of course, a typical peroxide linkage. Among the peroxy mono acids which are suitable for the practice of this invention may be listed: peroxymonosulfuric acid, peroxyacetic acid, peroxymonophosphoric acid and peroxybenzoic acid. It is also possible to use the salts (potassium, ammonium, calcium, etc.) of these peroxy mono acids to separate cobalt and nickel according to this invention.

These peroxy monoacids may be further defined by the generic formula

H—O—O—R where R is an acid radical which may be derived from an inorganic or organic acid, the latter including acids of both aliphatic and aromatic derivation.

It has been found particularly convenient to use peroxymonosulfuric acid, which is conveniently made by reacting hydrogen peroxide with concentrated sulfuric acid. Thus, for example, if 90 percent $H_2O_2$ is reacted with concentrated $H_2SO_4$ in a molar ratio of 1 to 1.5, there results a solution which is about 42 percent by weight $H_2SO_5$ (Caro's acid). If 50 percent $H_2O_2$ is used in the same molar ratios, the resulting aqueous solution of $H_2SO_5$ has a concentration of about 20 percent Caro's acid. No further separation of the peroxy acid need be carried out, and it may be introduced as formed into the nickel-cobalt solution according to this invention.

In like manner, other peroxy mono acids may be made and used. These acids are relatively stable over a period of time, but some of them (notably peroxymonosulfuric acid) cannot be conveniently shipped. In some cases it may therefore be desirable to use the salts of these acids. Such salts are known and their preparations have been described. See for example Canadian Patent 553,524.

The neutralizing agent used to control the pH of the solution may be any suitable alkaline material. It has been found convenient to use a slurried, slaked lime. This material is easily handled, readily available, inexpensive, and acts as a filter aid in addition to a neutralizing agent. Strongly alkaline materials such as sodium hydroxide and sodium carbonate may, of course, be used but generally these stronger alkaline materials introduce greater variations in pH and their use is therefore more difficult to control.

The reaction by which the cobalt is precipitated and separated from the nickel in accordance with this invention is essentially an instantaneous one. However, it is generally feasible to permit the reaction to proceed with moderate agitation for 15 to 30 minutes in order to assure thorough and complete mixing and reaction of the precipitating agent with the cobalt contained therein.

Although it is possible to use only the theoretical amount of peroxy mono acid or salt thereof required to react with the cobaltous ions present to form cobaltic ions, it is generally preferable to introduce sufficient of the peroxy mono acid or salt to amount to about 1.5 to 2 times that theoretically required. The use of an excess of precipitating agent does not seem to alter the sharp separation and precipitation of the cobalt ions nor does it cause any substantial quantity of nickel to precipitate.

In the process of this invention it is possible to introduce the peroxy mono acid and the neutralizing agent in one of several orders. Thus, for example, the peroxy mono acid and neutralizing agent may be added slowly and simultaneously to the nickel-cobalt solution. When this is done, it is preferable to calculate beforehand the approximate quantities of each of the reagents to be added so that the pH of the final liquid containing the precipitated cobalt may be within the range desired.

A second method comprises the steps of adding a calculated amount of neutralizing agent first to the nickel-cobalt solution (preferably that amount which will be sufficient to raise the pH to between 8 and 10) and then subsequently slowly adding the peroxy mono acid to the alkaline solution with moderate stirring. In this case it is also necessary to estimate the approximate amount of neutralizer required to give the desired pH after the required quantity of peroxy mono acid reagent has been added.

A third method comprises separately adding sufficient neutralizing agent directly to the peroxy mono acid reagent to give the mixture a pH of about 5 or a pH within the range desired. This premixed reagent is then added to the neutral solution of nickel and cobalt sulfate.

As will be seen in the following examples, excellent separation of cobalt and nickel has been obtained using any one of these three mixing procedures. The final choice of procedure will probably depend upon the conditions and apparatus in which the process is to be carried out.

In determining the amount of cobalt removed from the solution, it was possible, in addition to regular analytical methods, to use a fairly simple assay method developed in the course of this invention. This consisted of taking an aliquot containing not more than 0.05 gram nickel and 0.005 gram cobalt in a 150 ml. beaker. After diluting this quantity to about 25 ml., 3 drops of concentrated nitric acid and 5 ml. of diethylenetriamine were added and the mixture stirred. To this was then added a few grains of solid $(NH_4)_2S_2O_8$ and the solution stirred and then permitted to stand for five minutes. The solution was then made up to 50 ml., well mixed and an aliquot examined in a Beckman spectrophotometer at 830 m$\mu$ and 470 m$\mu$. Absorption at 830 m$\mu$ gave the nickel content from a standard nickel curve. Cobalt was determined by applying the 830 m$\mu$ nickel reading on the 830 m$\mu$ and 470 m$\mu$ curve to determine the equivalent nickel reading at 470 m$\mu$ where the maximum absorption of cobalt occurs. This value was subtracted from 100 and the difference added to the 470 m$\mu$ reading. This corrected figure was then applied to a standard cobalt curve to obtain the cobalt content.

The following examples, which are meant to be illustrative and not limiting, will further describe the process of this invention.

*Example I*

200 ml. aliquots of a solution containing approximately 4.7 gms./l. nickel and .475 g./l. cobalt, present as the sulfates, were treated simultaneously with peroxymonosulfuric acid (approximately 20% concentration) and slurried, slaked lime, the latter being added in sufficient quantity to give a final pH of 5. These reagents were added slowly with mild stirring, and the reaction was permitted to go for about 30 minutes. The quantity of peroxymonosulfuric acid was varied so that in the first run the theoretical amount required to convert all of the cobaltous ions to cobaltic ions was added. In the second run sufficient peroxy mono acid reagent was used to provide twice the theoretical amount required.

After the completion of the reaction the material was filtered, cobalt being precipitated and separated in the form of a dark gray cake and the nickel remaining in the filtrate. In the run in which the theoretical amount of peroxy mono acid reagent was added the filtrate contained 4.3 g./l. nickel or 92.5% of the original nickel present in the solution. It also contained 0.1 g./l. cobalt or 21% of the original cobalt present. In the run in which twice the theoretical amount of peroxy mono acid reagent was used the filtrate contained 4.05 g./l. nickel or 85% of the original nickel present. In this latter case there was no detectable cobalt in the filtrate.

*Example II*

A 200 ml. aliquot of a solution containing 5 g./l. nickel and .69 g./l. cobalt, present as sulfates, was treated with 1.6 times the theoretical quantity of a peroxymonosulfuric acid solution (approximately 20% concentration) required to convert all of the cobaltous ions present to cobaltic ions. Simultaneously with the introduction of the peroxy mono acid, sufficient slaked, slurried lime was added to give a pH of 5.5. Stirring was continued slowly for about 20 minutes and the mixture filtered as in Example I. The filtrate contained 4.4 g./l. nickel, or 88% of that originally present in the neutral solution. There was, however, no detectable amount of cobalt present in the filtrate.

A second 200 ml. aliquot of the same solution was treated in the same manner as the first aliquot, except that after 15 minutes of slow stirring sufficient sulfuric acid was added to reduce the pH to 4.5. An analysis of the filtrate indicated that all of the nickel originally present was retained in the filtrate along with about 0.03 g./l. cobalt, or about 4.3% of the cobalt originally present.

*Example III*

A 200 ml. aliquot of a solution containing 5 g./l. nickel and 0.69 g./l. cobalt, present as the sulfates, was treated first with sufficient slurried, slaked lime to give a pH of 10. Then enough of a 20% peroxymonosulfuric acid was added in one minute along with some dilute sulfuric acid to rapidly reduce the pH to 5. The resulting mixture was stirred for two minutes, filtered and the filtrate analyzed for nickel and cobalt. The filtrate contained 4.55 g./l. nickel or about 91% of the original nickel in the solution, and .005 g./l. cobalt or about 7% of that originally present. This means that approximately 9% of the original nickel was precipitated while about 7% of the cobalt remained in the filtrate.

*Example IV*

A 200 ml. aliquot of a solution containing 5 g./l. nickel and 0.63 g./l. cobalt, present as sulfates, was treated simultaneously with sufficient 40% peroxyacetic acid to furnish about 1.5 times the theoretical amount required and with sufficient slurried, slaked lime to give a final pH of 5.5. As in Example I, these reagents were added slowly and mild stirring of the mixture was continued for 20 minutes. After the completion of the reaction the material was filtered to remove the cobalt which was precipitated in a form of a dark gray cake. An analysis of the filtrate indicated that 4.75 g./l. or 95% of the original nickel was present in the filtrate, while .02 g./l., or 30% of the original cobalt remained in the filtrate.

*Example V*

A 200 ml. aliquot of the solution of nickel sulfate and cobalt sulfate used in Example IV was treated with sufficient perbenzoic acid to furnish about 1.5 times the theoretical required. The reaction was carried out in a manner similar to that in Example IV. The filtrate was tested qualitatively by means of the simple assay process described above and the results were essentially the same as those obtained in the preceding examples, that is, essentially all of the nickel remained in the filtrate while substantially all of the cobalt was precipitated.

*Example VI*

Example V was repeated using an equivalent amount of peroxyphosphoric acid in place of the perbenzoic acid of that example. Similar qualitative tests indicated similar results, i.e., good cobalt removal in the precipitate with essentially all of the nickel remaining in the filtrate.

*Example VII*

A 20% monoperoxysulfuric acid was diluted to give 10% aqueous solution and this was neutralized to a pH of 5.5 with powdered calcium carbonate, to form the monoperoxy salt $Ca(HSO_5)_2$. This salt was added to a 200 ml. aliquot of the nickel-cobalt sulfate solution of Example IV and the resulting mixture stirred for about 20 minutes. Analysis of the filtrate resulting after the dark gray cobalt precipitate had been filtered out indicated that there was present 4.6 g./l. nickel in the filtrate or approximately 92% of that originally present. There was no detectable quantity of cobalt in the filtrate.

The above examples have all been drawn to the precipitation of cobalt ions from a solution of cobalt and nickel sulfates since it is common commercial practice to extract cobalt and nickel from sulfate solutions. However, the process of precipitating cobalt ions with peroxy mono acids and the salts thereof, according to this invention, may be used to remove cobalt from a cobalt-nickel solution of other anions, such as for example solutions of chlorides, nitrates and the like.

Attempts were made to remove the cobalt in the form of a precipitate by using peroxydisulfuric acid and dipersulfates in place of the mono peroxy acids and their salts. It was found, however, that only a very small quantity of cobalt could be removed with the peroxy di acids or their salts, thus indicating that the reaction by which the cobalt was removed was specific to the peroxy mono acids and their salts.

The use of peroxy mono acids and their salts affords a simple and efficient means for separating cobalt and nickel. The reaction by which this is accomplished is carried out at ambient temperature and pressure and the degree to which the nickel solution which results is free from cobalt may be regulated by proper pH control.

We claim:
1. Method of separating nickel and cobalt, characterized by the steps of adding to a solution of salts of nickel and cobalt a precipitating agent selected from the group consisting of peroxy mono acids and salts thereof, and adjusting the pH to range from about 3 to about neutral.

2. Method in accordance with claim 1 wherein said precipitating agent is peroxy-monosulfuric acid.

3. Method of separating nickel and cobalt, characterized by the steps of adding to a solution of salts of nickel and cobalt a precipitating agent selected from the group consisting of peroxy mono acids and salts thereof, adjusting the pH to range from about 3 to about 7, and separating the resulting precipitated cobalt from the filtrate containing nickel in solution.

4. Method of separating nickel and cobalt, characterized by the steps of adding to a solution of salts of nickel and cobalt a precipitating agent selected from the group consisting of peroxy mono acids and salts thereof, adjusting the pH to range from about 4.5 to about 5.5, and separating the resulting precipitated cobalt from the filtrate containing nickel in solution.

5. Method of separating nickel and cobalt, characterized by the steps of simultaneously adding to a solution of salts of nickel and cobalt a precipitating agent and a neutralizing agent, said precipitating agent being selected from the group consisting of peroxy mono acids and salts thereof, and said neutralizing agent being added in sufficient quantity to maintain the final pH at between about 3 and 7.

6. Method of separating nickel and cobalt, comprising the steps of adding to a solution of salts of nickel and cobalt a neutralizing agent and subsequently adding a precipitating agent selected from the group consisting of peroxy mono acids and salts thereof, said neutralizing agent being present in sufficient quantities to maintain the pH of the resulting mixture between about 3 and 7 after the addition of said precipitating agent.

7. Method for separating nickel and cobalt, comprising the steps of neutralizing a precipitating agent selected from the group consisting of peroxy mono acids and salts thereof, and adding the resulting neutralized precipitating agent to a solution of salts of nickel and cobalt.

8. Method of separating nickel and cobalt, comprising the steps of forming a solution of salts of cobalt and nickel, adding to said solution a precipitating agent selected from the group consisting of peroxy mono acids and salts thereof, adding a neutralizing agent to adjust the final pH to range between 3 and 7, stirring the mixture to insure complete reaction, and separating the resulting precipitated cobalt from the filtrate.

9. Method in accordance with claim 8 wherein said neutralizing agent is slurried, slaked lime.

10. Method of separating nickel and cobalt, characterized by the steps of adding to a solution of salts of nickel and cobalt a precipitating agent selected from the group consisting of peroxy mono acids and salts thereof and in a concentration sufficient to furnish from about 1.5 to 2 times the amount required to convert all of the cobaltous ions in said solution to cobaltic ions, adjusting the pH to range from about 3 to about neutral and separating the resulting precipitated cobalt from the filtrate containing nickel in solution.

11. Method of separating nickel and cobalt, characterized by the step of adding to a solution of salts of nickel and cobalt, maintained at a pH between 3 and 7, a precipitating agent selected from the group consisting of peroxy mono acids and salts thereof.

References Cited in the file of this patent

UNITED STATES PATENTS

| | | |
|---|---|---|
| 2,232,527 | Hill | Feb. 18, 1941 |
| 2,694,006 | Schaufelberger et al. | Nov. 9, 1954 |
| 2,805,940 | Bennedsen | Sept. 10, 1957 |

OTHER REFERENCES

The Condensed Chemical Dictionary, Reinhold Publishing Corp., New York, 1942, 3rd edition, page 351 only.